Oct. 3, 1933.   T. A. KIRTON   1,929,116
SELF LOCKING BOLT
Filed March 17, 1932   2 Sheets-Sheet 2
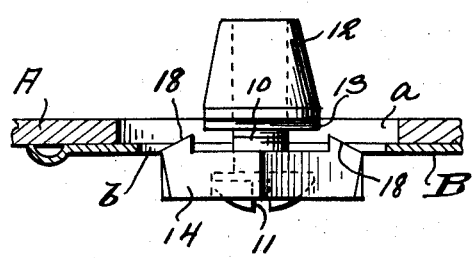
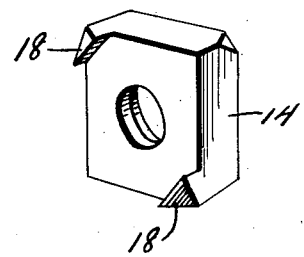
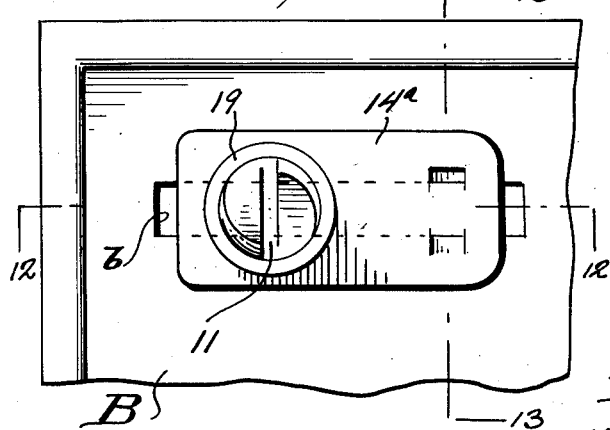
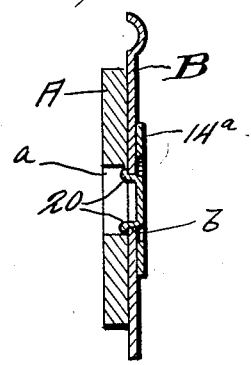
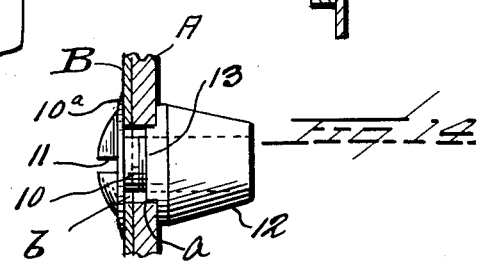
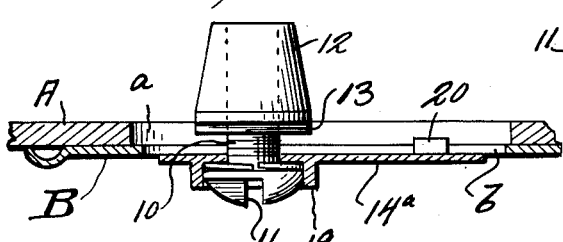
Inventor
T. A. Kirton
By Watson E. Coleman
Attorney Patented Oct. 3, 1933

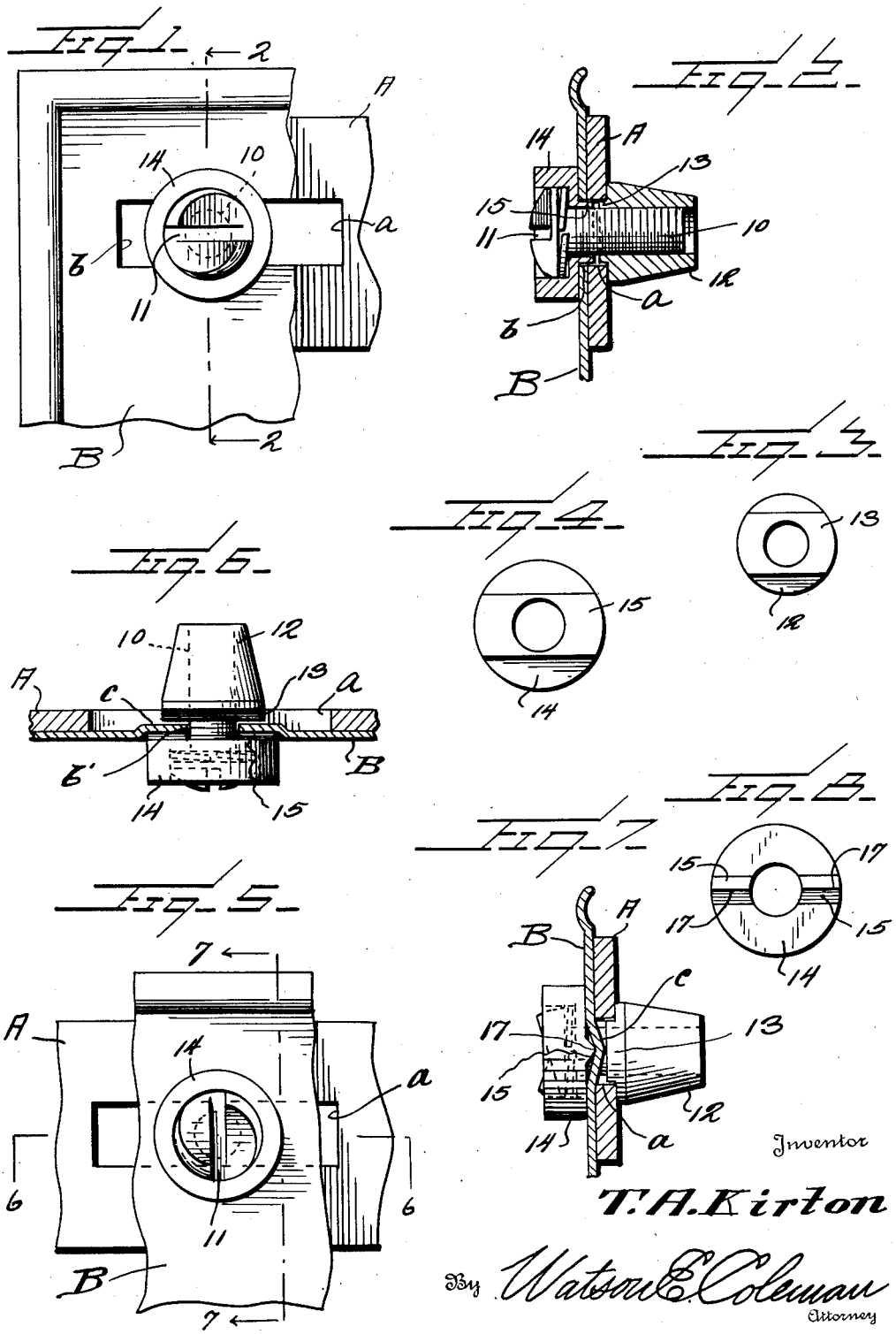

1,929,116

UNITED STATES PATENT OFFICE 1,929,116

SELF-LOCKING BOLT

Thomas A. Kirton, Jacksonville, Fla.

Application March 17, 1932. Serial No. 599,577

5 Claims. (Cl. 40—125)

This invention relates to means used for holding automobile license plates in engagement with the brackets or supports for the same and particularly to a bolt, nut and washer construction so formed that when the nut has been screwed home and the plates held in engagement with each other, the nut cannot be moved nor the bolt detached unless the bolt is cut off or the license plate injured so as to render it invalid.

A further object is to provide a construction of this character which embodies a bolt, a nut therefor, and a washer, the bolt having a ratchet nicked head or being what I term a one-way bolt, the nut having a lug upon its inner face entering the slot in the bracket, the washer being recessed to receive and surround closely the circumferential portion of the head of the bolt and upon its inside face being formed with inwardly protuberant portions adapted to engage in the slot of the license plate when the nut and bolt are screwed home to thus prevent the turning of the washer with relation to the license plate or the turning of the nut, and another object in this connection is to provide a washer of this character having inwardly projecting portions which may be disposed within the slot of the license plate, or, where the license plate is simply formed with a bolt hole, may be forced into the material of the license plate, thus locking the washer from rotation or when the washer is rotated under considerable force, the inwardly protuberant portions will tear or cut the license plate, thus rendering it useless but permitting its detachment.

Other objects will appear in the course of the following description.

My invention is illustrated in the accompanying drawings, wherein:—

Figure 1 is a fragmentary front elevation of a license plate and bracket with my improved bolt attached thereto;

Figure 2 is a section on line 2—2 of Figure 1;

Figures 3 and 4 are face views of the nut and washer respectively;

Figure 5 is a fragmentary elevation of a bracket and license plate showing a modified form of nut applied thereto;

Figure 6 is a section on line 6—6 of Figure 5;

Figure 7 is a section on line 7—7 of Figure 5;

Figure 8 is an inside face view of the nut;

Figure 9 is a sectional view through a bracket and license plate showing a modified form of washer;

Figure 10 is a perspective view of the washer shown in Figure 9;

Figure 11 is an elevation of a license plate and bracket showing a modified form of attaching means;

Figure 12 is a section on line 12—12 of Figure 11;

Figure 13 is a section on line 13—13 of Figure 11;

Figure 14 is a sectional view through a bracket and license plate showing a further modification of the bolt;

Figure 15 is a front elevation of the bolt shown in Figure 14.

Referring to Figure 1, A designates the usual bracket for supporting a license plate and $a$ the slot therein, B designating the license plate itself provided with the slot $b$.

The bolt 10 has the usual screw-threaded shank but the head of the bolt is formed with what I call a ratchet nick, that is, a nick 11 formed so that a screw driver may be inserted for rotating the bolt in one direction but the screw-driver will slip out of the nick when the driver is rotated in the opposite direction. By this means the bolt may be screwed up but cannot be unscrewed The nut 12 may be cylindrical, conical or many-sided. It is shown, however, as having the form of a frustrated cone, the inner face of the nut being formed with a projecting lug 13. This lug extends across the face of the nut parallel to a diametric line intersecting the screw-threaded aperture in the nut and the aperture passes through it. The lug is of such width and so formed that it will enter the slot $a$ of the bracket A and fit therein sufficiently snugly as to prevent the nut being turned when this lug is inserted.

Coacting with the bolt is a washer 14 having a central recess which is sufficiently deep as to receive the head of the bolt and nearly house or enclose this head. Thus when the bolt is turned home, a wrench cannot be applied to the edge of the bolt head. The inner face of this washer is provided with the lug 15 through which the central aperture extends.

In the use of this device, the nut is placed upon the bolt after the bolt has been inserted through the slots $b$ and $a$ and turned home. The diametrically extending lug 13 on the inner face of the nut 12 is disposed within the slot $a$ of the bracket and thus the nut is held from rotation. The bolt is turned until the lug 15 on the washer is forced into the slot in the license plate B and partly into the slot $a$. Under these circumstances, the nut 12 cannot be rotated because it is held by its lug, the washer cannot be rotated because it is held in engagement with the slots $b$ and $a$ and the bolt cannot be rotated reversely. Thus it will be seen that the nut cannot come off nor can the washer rotate and the bolt head will bind so tightly within the washer that there is no danger of the bolt being detached.

In Figure 5, I illustrate another embodiment of the invention wherein the same reference numerals are used and which is constructed in the same manner as in Figure 1 but in which the washer 14 is formed with the transversely extending lug 15 but this lug is sharp-pointed or sharp-edged as at 17. A washer of this character may be used with a bracket and license plate both of which are slotted with the slots a and b but if a bolt of this character is used with a license plate simply formed with a bolt hole b' as illustrated in Figure 7, then when the bolt is screwed home, the head of the bolt will force the washer inward without rotating the washer and the sharp edges 17, particularly if these edges are disposed immediately opposite the slot a of the bracket A, will act to force the material of the license plate inward as shown at c so that the material of the license plate is forced into the slot a and the lugs 15 are forced into the license plate, thus locking the bolt against any rotation. Here again, in order to remove this bolt, it is necessary to cut the license plate inward to the bolt hole or else cut off the bolt. It is intended that the bolt and its allied parts shall be of very hard material so that it will be difficult to cut, thus making it imperative to practically destroy or render invalid the license plate in order to remove it from the car.

In Figure 9, I illustrate another form of my device in which the same reference numerals are used for the same parts. In this figure, however, the washer 14 is provided upon its inner face at its opposite corners, (the washer being square or diamond-shaped in plan, though I do not wish to limit myself to this shape) with the inwardly projecting triangular teeth 18. Here if the bolt locking device is to be used with a slotted license plate, the washer is disposed with its lugs or teeth 18 within the slot d of the license plate B, the nut 12, of course, being disposed with its lug 13 within the slot of the bracket A. Under these circumstances, the washer is held from rotation by its lugs 18 entering and fitting snugly within the slot of the license plate but if the license plate is only provided with a bolt hole and the bolt is screwed home, these sharp pointed teeth 18 are forced into the material of the license plate and force this material into the slot a of the bracket, thus locking the license plate from rotation upon the bolt, locking the washer from rotation and locking the nut from rotation. If, however, this device is applied to a license plate having a mere bolt hole, and not a slot, then the washer being many-sided, a wrench may be applied to the washer and the washer may be turned counter-clockwise. Such action will tend to unscrew the bolt but will also cause the teeth 14 to cut a hole in the license tag, rendering it unfit for further use.

In Figure 11 I illustrate still a further modification of my invention in which the washer, in this case designated 14ᵃ, is in the form of an elongated strip of thin metal having a width either greater than the usual slot in the license tag B or having a width slightly less than this slot.

This strip adjacent one end is formed with the annular wall 19 which defines the recess receiving the bolt head. Adjacent the other end of the strip 14a two tongues are cut and depressed from the strip, these tongues being designated 20. These tongues are disposed preferably to engage the walls of the slot a and bear against these walls and extend over upon the inside face of the license tag. At the end of the season or whenever it is desired to remove the license tag, the lateral extension of the strip 14a from the recess receiving the bolt head, woud be raised, tearing out the portion of the tag above the slot and by turning the arm constituted by the strip 14a counterclockwise, the action would release the bolt. This style of washer when used with nut and bolt heretofore specified makes an economical fastener for tags having a slot at least one inch in length.

In Figure 14 I show another and very simple form of my invention in which the nut 12, as previously described is used in connection with a bolt 10 having the usual screw-threaded shank but the head 10a in this case is formed with a very thin margin, the central portion of the head being relatively thick and formed with the ratchet nick 11, as previously described. In this form of the device, the nut has its lug 13 inserted in the slot of the bracket, then the screw 10 is turned home until the license plate is clamped against the bracket. By reason of the fact that the head 10a is very thin, it is practically impossible, or at any rate very difficult, to turn the screw 10 within the nut and, of course, the ratchet nicks prevent the screw being reversed by means of a screw driver. While this bolt is not entirely locked as are the other bolts that I have referred to, it forms a very secure attaching means and it is very difficult to release.

I claim:—

1. The combination with two elements each having a slot, a bolt passing through the slot and having a ratchet nick in its head, a nut engaging the bolt and having on its inside face a projection fitting into the slot of the element adjacent the nut, a washer through which the bolt passes recessed on its outer face to receive the head of the bolt and on its inside face having a projection adapted to engage with the said slot and bear against the walls thereof to thereby prevent the nut and washer from relatively turning.

2. A fastening device comprising a bolt having a head provided with a ratchet nick, a nut cylindrical in cross section and having a projection on its inner end adapted to be disposed within the slot of an element and be held from rotation by said slot, a washer recessed to receive the head of the bolt, the washer on its face toward the nut having diametrically disposed teeth adapted to enter the slot of an element and be held from rotation thereby, said teeth being sharp pointed whereby when the washer is rotated in a direction to unscrew the bolt, the sharp points will tear and deface the material with which the fastening device is used.

3. A fastening device for use in holding license plates on slotted brackets comprising a bolt having a head provided with a ratchet nick, a nut cylindrical in cross section and engaging said bolt and having a projection on its inner face adapted to fit within the slot on the bracket and be held from rotation thereby, a washer recessed to receive the head of the bolt, the washer on its face toward the nut having projections adapted as the nut and bolt are turned home to be forced into the metal of the license plate and force the metal of the license plate into the slot in the bracket.

4. A device for fastening license plates to slotted supporting brackets comprising a bolt having a ratchet nick in its head, a nut engaging the bolt, the nut having on its inner face an inwardly projecting lug adapted to engage within the slot of the bracket to thereby hold the nut from rotation when screwed home, and a washer formed to provide a recess to receive and surround the head of the bolt, the washer having an inwardly projecting portion upon its face confronting the nut and adapted to be inserted in and engaged with the walls of the slot of the license plate.

5. A device for fastening license plates to slotted supporting brackets comprising a bolt having a ratchet nick in its head, a nut engaging the bolt, the nut having on its inner face an inwardly projecting lug adapted to engage within the slot of the bracket to thereby hold the nut from rotation when screwed home, and a washer comprising a strip of metal having a length less than the slot in the license plate, the strip of metal being formed upon one face with a recess to receive the head of the bolt and surround the same, the other face of the strip being formed to provide inwardly and laterally turned prongs adapted to pass through the slot in the license plate and engage the rear face thereof.

THOMAS A. KIRTON.